Jan. 14, 1930.        A. C. SCHNEIDER ET AL        1,743,935
FLY SCREEN
Filed June 28, 1929
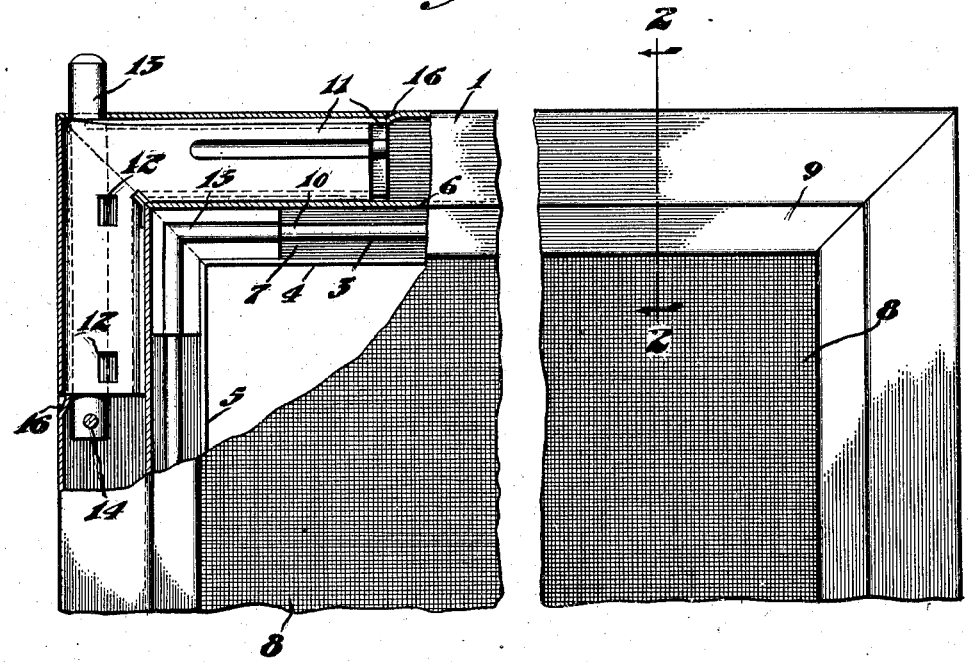
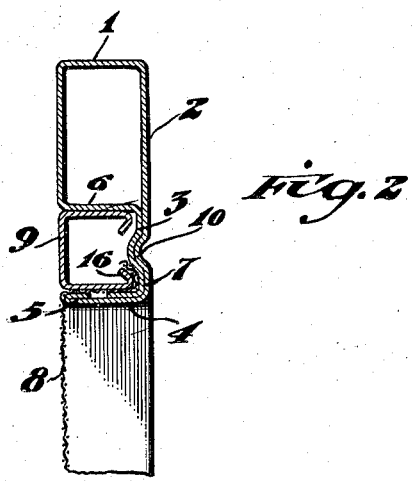
INVENTORS
Albert C. Schneider
Harry E. Schneider
BY
Ward & Ward
ATTORNEYS Patented Jan. 14, 1930.

1,743,935

UNITED STATES PATENT OFFICE

ALBERT C. SCHNEIDER, OF FORT THOMAS, AND HARRY E. SCHNEIDER, OF NEWPORT, KENTUCKY, ASSIGNORS TO THE CINCINNATI FLY SCREEN COMPANY, OF CINCINNATI, OHIO, A CORPORATION OF OHIO

FLY SCREEN

Application filed June 28, 1929. Serial No. 374,319.

This invention relates to improvements in rewirable metal fly screen frames and particularly to the fabrication and structure of a sheet metal molding from which the screen frame is built and to the corner reinforcement or angle braces for joining a pair of miter cut ends of the molding in making a rectangular frame.

An object of the invention is to shape a strip of sheet metal into a return bend forming a molding strip having a rectangular tubular body portion and a channel open at a face side of the body portion with the base wall of the channel of double material thickness due to the lapping of the material along such line and corrugated longitudinally of the channel to give physical and ornamental value to the molding.

Other features and advantages of the invention are more fully set forth in the description of the accompanying drawing, in which:

Figure 1 is a plan view of a portion of a sheet metal window screen frame with the screen applied and with one of the corners of the frame shown in section for illustrating the corners of angular plates engaged within the metal framing for uniting and reinforcing the miter cut ends thereof.

Figure 2 is an enlarged section taken on line 2—2, of Figure 1.

The screen frame is built up from sheet metal molding of particular formation to comprise a tubular body portion and a channel portion for receiving and clamping the metal screen fabric or gauze to the frame by a channel form of beading compressed into the channel or groove of the frame which in principle follows a well recognized commercial form of sheet metal framing or molding for window screen frames.

To maintain such channel characteristics of the molding or framing and to reinforce and strengthen the same at and along the screen fabric receiving and fastening groove or channel, the molding is preferably formed by bending, crimping and corrugating the metal to give the same the following cross sectional structure.

Figure 2 illustrates the cross section of the structure of the molding, formed of a single sheet of metal and bent to comprise a rectangular hollow or tubular body portion 1 with the opposite longitudinal ends of the sheet metal brought together and lapped upon one another and continuing beyond one edge of the body portion. One side wall designated as a base wall 2 extends from the body portion and in continuing plane for the base of the channel 3 along one edge of the body portion, and thence bends or extends at right angles for the width of the body, forming an outside wall 4 of the channel, with its end 5 crimped inwardly upon itself to provide a double thickness of edge for said channel wall. The crimp bend, if desired, may be different by soldering or welding the same to the channel wall. The opposite longitudinal end of the sheet is bent into U form to provide an intermediate wall 6 providing the inside end wall of the body portion and channel, and a channel base wall 7 is lapped upon the extended portion of the base wall 2, forming an additional base wall for the channel for providing a double ply thickness for the channel base, and a right angled edge or end lapping upon the outside channel wall 4.

With the opposite edges of the sheet metal lapped or crimped upon the outside channel wall 4, the wall is practically of two ply thickness, giving the same increased rigidity and stability to sustain the screen fabric 8 which is secured to the molding or screen frame by engaging an end thereof over the edge of the channel wall 4, and into the channel to be clamped in position by a channel or other form of beading 9 compressed into the channel.

To give increased rigidity to the molding, and to prevent the intermediate wall 6 from shifting laterally or thrown out of square when the beading is inserted, the lapped channel base walls jointly are compressed into a corrugation 10 longitudinally of the channel, thus binding the parts securely together, as well as offering reinforcement. This is of material advantage in the structure of the molding, and also adds to the ornamental effect of the molding.

The beading 9 for clamping the screen fabric into the channel of the frame or molding, as illustrated, comprises a strip of sheet metal bent into channel or U form with its opposite ends crimped inwardly with the crimp 16 disposed at an angle so that the wall edge of the beading serves as a wedge for binding the screen fabric between the wall 4 and base corrugation 10 of the channel.

For building up the molding into a screen frame, the molding is cut into definite length with its opposite longitudinal ends mitered to make a corner joint for the frame, and interlocked with an angled dowel or corner brace engaging into the tubular body 1. The dowel or corner brace preferably comprises a pair of right angled channel plates 11—11 of duplicate construction, engaged together with their channel sides opposing, combining the same into tubular form, with their opposite ends or edges forming in the channel, overlapping one another. When thus combined the corner plates compare to the inside measurement of the body portion of the molding so as to make a friction fit therewith when engaged therein.

Each channel corner or angle plate 11 comprises a sheet metal stamping with the limbs thereof of U or channel form in cross section, and with one limb thereof having its base wall corrugated longitudinally, and the other limb provided with a pair of inturned tangs 12—12, compressed inwardly from the body of the metal, for sustaining and confining a pin 13.

The pin as shown in Figure 1 is rigidly secured to the frame by a rivet 14 extending through the frame at the lower end of the pin, while the upper or opposite end projects or extends beyond the edge of the frame for engaging into a socket in the window frame to which the screen frame is applied. This provides a spindle for hingedly mounting the screen frame, and in practice is similarly provided with a pin engaged with the angle or corner base plates but usually slidable and operated by a lever having a finger engaging end accessibly extending from the frame. The use of fixed and slidable pins at relative opposite ends or corners of the screen frame for hinge mounting is a general practice, so that no novelty is herein claimed in the provision thereof, but only as to the method of mounting the pins, and in the structure of the angle plate, for guidingly or confiningly sustaining the pins.

To further reinforce the corner of the frame, a corrugated angle plate 15 is inserted within the channel under a friction or drive fit, with the corrugation nesting over the corrugation in the base wall of the molding. Thus by joining the mitered corners by a pair of angle plates engaged within the body portion of the molding, and a single angle plate within the channel, the entire joint length is reinforced and sealed so that no light is visible through the joint, due to failure to completely abut the mitered surfaces, which otherwise detracts from the general appearance of the frame or impairs the workmanship, but in some cases it is desired not to bring the joint surfaces home. In fitting the frame, the corner plates usually are not permanently fixed so as to allow such slight shifting.

The outer wall of each tubular body is punched as at 16 to limit the sliding of the bodies over the right angled channel plates 11. The abutments created by the punching engage the outer ends of the respective channel plates 11 and provide that the bevelled edges of the tubular bodies fit snugly and do not extend beyond their true mating position.

Having described our invention, we claim:

A sheet metal molding for screen frames, comprising, a rectangular tubular body portion and a channel along one edge side of the body, said body and channel in cross section representing a return bend, providing a rectangular body with the metal lapped together for the base and outside channel walls to provide a double wall thickness, said outside channel wall having an inturned crimped edge longitudinally, said channel base wall corrugated longitudinally of the channel securing the walls against relative lateral displacement, and a beading for clamping the wire fabric in the channel, composed of a sheet metal strip of U form in cross section, with its opposite ends crimped inwardly, and the crimp angled from its adjoining wall portion.

In witness whereof, we hereunto subscribe our names.

ALBERT C. SCHNEIDER.
HARRY E. SCHNEIDER.